(12) United States Patent
Velasco

(10) Patent No.: US 10,118,704 B2
(45) Date of Patent: Nov. 6, 2018

(54) HYBRID SEAT PAN AND DIAPHRAGM

(71) Applicant: Howard Velasco, Bristol, CT (US)

(72) Inventor: Howard Velasco, Bristol, CT (US)

(73) Assignee: Franklin Products, Inc., Torrington, CT (US)

( * ) Notice: Subject to any disclaimer, the term of this patent is extended or adjusted under 35 U.S.C. 154(b) by 47 days.

(21) Appl. No.: 15/091,118

(22) Filed: Apr. 5, 2016

(65) Prior Publication Data

US 2016/0297536 A1 Oct. 13, 2016

Related U.S. Application Data

(60) Provisional application No. 62/145,617, filed on Apr. 10, 2015.

(51) Int. Cl.
B64D 11/06 (2006.01)
B60N 2/70 (2006.01)
A47C 7/28 (2006.01)

(52) U.S. Cl.
CPC .......... B64D 11/0647 (2014.12); A47C 7/282 (2013.01); A47C 7/285 (2013.01); B60N 2/7011 (2013.01); B64D 11/0649 (2014.12); Y02T 50/46 (2013.01)

(58) Field of Classification Search
CPC .............. B60N 2/7011; B64D 11/0649; B64D 11/0647; A47C 7/282; A47C 7/285
USPC ..................................... 297/452.56
See application file for complete search history.

(56) References Cited

U.S. PATENT DOCUMENTS

| 612,620 | A | | 10/1898 | Van Devanter | |
|---|---|---|---|---|---|
| 3,224,017 | A | * | 12/1965 | Zerbee | A47C 7/282 297/287 |
| 4,552,406 | A | | 11/1985 | Ohl | |
| 5,133,587 | A | * | 7/1992 | Hadden, Jr. | B60N 2/4214 297/146 |
| 5,485,976 | A | * | 1/1996 | Creed | B64D 11/06 244/118.6 |
| 5,681,091 | A | | 10/1997 | Larson et al. | |
| 5,735,578 | A | | 4/1998 | Penley | |
| 5,904,407 | A | | 5/1999 | Larson et al. | |
| 6,038,426 | A | * | 3/2000 | Williams, Jr. | B64D 11/0015 725/77 |
| 6,059,368 | A | * | 5/2000 | Stumpf | A47C 1/03 297/440.11 |
| 6,439,665 | B1 | * | 8/2002 | Cvek | A47C 7/16 297/440.11 |

(Continued)

FOREIGN PATENT DOCUMENTS

| CA | 2319884 A1 | 12/1993 |
|---|---|---|
| CA | 2270974 A1 | 5/1998 |

(Continued)

OTHER PUBLICATIONS

International Search Report for corresponding PCT application PCT/US2016/026615 dated Jul. 7, 2016.

*Primary Examiner* — Timothy J Brindley
(74) *Attorney, Agent, or Firm* — McCormick, Paulding & Huber LLP

(57) ABSTRACT

A hybrid seat pan and diaphragm apparatus includes a seat pan that has a concave portion and a diaphragm positioned at an occupant-facing side of the seat pan and stretched across the seat pan at a first distance above the concave portion of the seat pan.

14 Claims, 2 Drawing Sheets

(56) References Cited

U.S. PATENT DOCUMENTS

| | | | |
|---|---|---|---|
| 6,983,997 B2* | 1/2006 | Wilkerson | A47C 1/023 297/452.13 |
| 7,013,653 B2 | 3/2006 | Kamiya et al. | |
| 7,066,550 B1* | 6/2006 | Su | A47C 7/282 297/440.22 |
| 7,871,039 B2 | 1/2011 | Fullerton et al. | |
| 7,887,138 B2* | 2/2011 | Chen | A47C 3/00 297/452.18 |
| 8,251,454 B2* | 8/2012 | Tsukiji | A47C 7/282 297/219.1 |
| 8,550,564 B1 | 10/2013 | Kismarton et al. | |
| 8,672,411 B2 | 3/2014 | Gomes et al. | |
| 8,782,835 B2* | 7/2014 | Pozzi | B64D 11/06 244/118.6 |
| 9,090,352 B2* | 7/2015 | Saada | B60N 2/686 |
| 9,580,175 B2* | 2/2017 | Velasco | B64D 11/06 |
| 9,592,913 B2* | 3/2017 | Bell | B29C 70/545 |
| 2002/0060493 A1* | 5/2002 | Nishino | B60N 2/58 297/452.56 |
| 2006/0250019 A1* | 11/2006 | Wu | A47C 7/282 297/452.21 |
| 2007/0102987 A1* | 5/2007 | Chen | A47C 7/282 297/452.56 |
| 2007/0170759 A1* | 7/2007 | Nolan | B60N 2/2851 297/250.1 |
| 2007/0267905 A1* | 11/2007 | Cvek | A47C 7/282 297/284.2 |
| 2008/0122285 A1* | 5/2008 | Lin | A47C 7/282 297/452.56 |
| 2011/0169321 A1* | 7/2011 | Jung | A47C 7/282 297/452.64 |
| 2014/0138990 A1 | 5/2014 | Chesness | |
| 2016/0309900 A1* | 10/2016 | Tsai | A47C 7/282 |

FOREIGN PATENT DOCUMENTS

| | | |
|---|---|---|
| CN | 1923088 A | 3/2007 |
| JP | 2001137065 A | 5/2001 |
| KR | 20100040528 A | 4/2010 |
| WO | 2005095210 A1 | 10/2005 |
| WO | 2014163582 A1 | 10/2014 |

* cited by examiner

HYBRID SEAT PAN AND DIAPHRAGM

CROSS-REFERENCE RELATED APPLICATIONS

This is a non-provisional and claims the benefit under 35 USC § 119(e) of U.S. Patent Application Ser. No. 62/145,617 filed Apr. 10, 2015, hereby incorporated herein by reference.

BACKGROUND

Technical Field

The invention relates to seating structures and, more particularly, to seating structures that include a suspension diaphragm for receiving an occupant's weight.

Discussion of Art

Aircraft seats commonly have a back structure and a seat bottom structure that are fitted with cushions and upholstery. The seat bottom carries the majority of the passenger's weight and is therefore of particular concern with regard to comfort. The seat bottom is located above structural members of the seat frame specifically the beam elements. To support the passenger above the hard, uneven seat structure, the seat bottom portion of the seat often employs either an elastomeric fabric diaphragm or a rigid pan that is covered with cushioning. Each method provides certain comfort benefits but neither is without shortcomings.

Rigid pans provide a consistent platform for the passenger and can have contoured shapes that address ergonomic needs. However, they are hard and require thicker cushions to make the occupant comfortable. Thicker cushions reduce the passenger's living space and increase weight.

Diaphragm systems typically comprise a fabric suspension tensioned across a frame. A cushion is placed on top of the diaphragm to distribute loads and pad areas where the frame might be felt by the passenger. Being flexible, the diaphragm has inherent comfort advantages. However, even if tightly tensioned, the diaphragm is often deflected by the passenger enough to cause contact with structural parts of the seat such as the beam. This contact is often felt by the passenger, causing discomfort. As with rigid pans, the correction is too often a thicker, heavier cushion. At a time when space is valuable to the passenger and weight means higher costs to the airline, thicker cushions are undesirable.

BRIEF DESCRIPTION

Embodiments of the invention provide a seat apparatus, which includes a seat chassis that has side frames connected by a cross beam; a seat pan above the cross beam; and a tensioned diaphragm above the seat pan. Other embodiments provide hybrid seat pan and diaphragm apparatus, which includes a seat pan that has a concave portion and a diaphragm positioned at an occupant-facing side of the seat pan and stretched across the seat pan at a first distance above the concave portion of the seat pan.

The first distance may be sufficient so that an occupant's weight does not deflect the diaphragm to touch the seat pan. On the other hand, the seat pan may restrict deflection of the diaphragm under an occupant's weight. The seat pan may be contoured to reduce contact pressure of an occupant's weight. Or the seat pan may have a cutout portion central to the concave portion, so that an occupant's weight can deflect the diaphragm through the cutout portion. In any case, the seat pan restricts the diaphragm from contacting the cross beam of the seat chassis. In certain embodiments, a vibration absorbing pad may be disposed between and in contact with the seat pan and the cross beam.

The diaphragm may be stretched across the seat pan between stiffeners that are fastened to the seat pan by rivets. Side edges of the diaphragm may be wrapped around the stiffeners and stitched together to capture the stiffeners. Alternatively, the diaphragm may be tensioned across the side frames of the seat chassis.

Thus, the described hybrid design combines benefits of both a rigid pan and a fabric suspension to preserve comfort without resorting to a thick cushion. The hybrid comprises a special frame and an elastomeric fabric diaphragm stretched laterally across the frame and/or tensioned fore and aft. Beneath the diaphragm is a specially shaped partial pan or pan portion that is attached integrally to the frame and is positioned to act as a barrier between the passenger and the beam structure that supports the frame. The shape and contour of this abbreviated pan provides a surface that is determined by ergonomic studies and designed to minimize discomfort.

With the described hybrid seat pan, the passenger still deflects the diaphragm but instead of contacting the beam or other hard parts of the seat's structure, comes to rest upon the specially shaped pan portion. The support of the diaphragm suspends the passenger enough to reduce the effective weight that is applied where the passenger and pan portion make contact. That results in lower contact pressures and less discomfort. Less padding is needed and cushions can be kept thinner. The thinner cushions used with this hybrid design preserve living space, minimize weight and offer opportunities to reduce material and manufacturing costs.

Other benefits of the hybrid system include increased durability. The thick cushion on a rigid pan system breaks down much quicker than typical elastomeric diaphragms, exposing the passenger to high contact pressures with the pan. The hybrid diaphragm is long lasting and the shaped pan portion is not subject to wear.

Certain exemplary embodiments, as briefly described above, are illustrated by the following figures.

DRAWINGS

DETAILED DESCRIPTION

Figure 1:
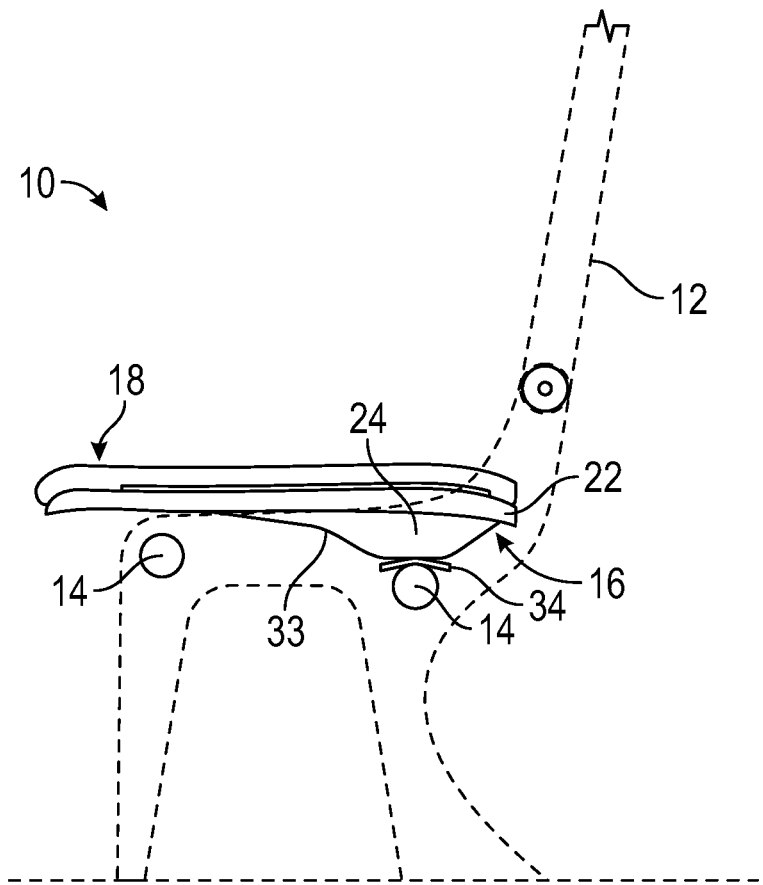
FIG. 1 shows in side view a seat assembly comprising a seat chassis that supports a hybrid seat pan and diaphragm assembly according to an embodiment of the invention.

Referring to FIG. 1, a seat chassis 10 comprises side members 12 and cross beams 14. A seat assembly 16 rests in the seat chassis 10 above the cross beams 14. It is a well known problem that a rearward portion of a conventional seat assembly can deform downward under an occupant to contact a rearward one of the cross beams 14. This contact can result in discomfort for the occupant. As discussed above, efforts to mitigate such discomfort typically have relied upon thick and relatively heavy cushions. According to the present invention, however, a relatively thin weight-saving cushion 18 is provided in combination with a hybrid seat pan and diaphragm assembly 16.

Figure 2:
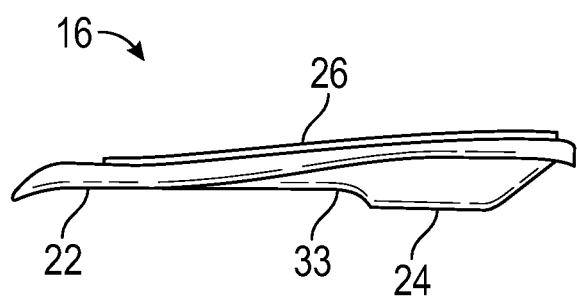
FIG. 2 shows in side view the hybrid seat pan and diaphragm assembly of FIG. 1.
Figure 3:
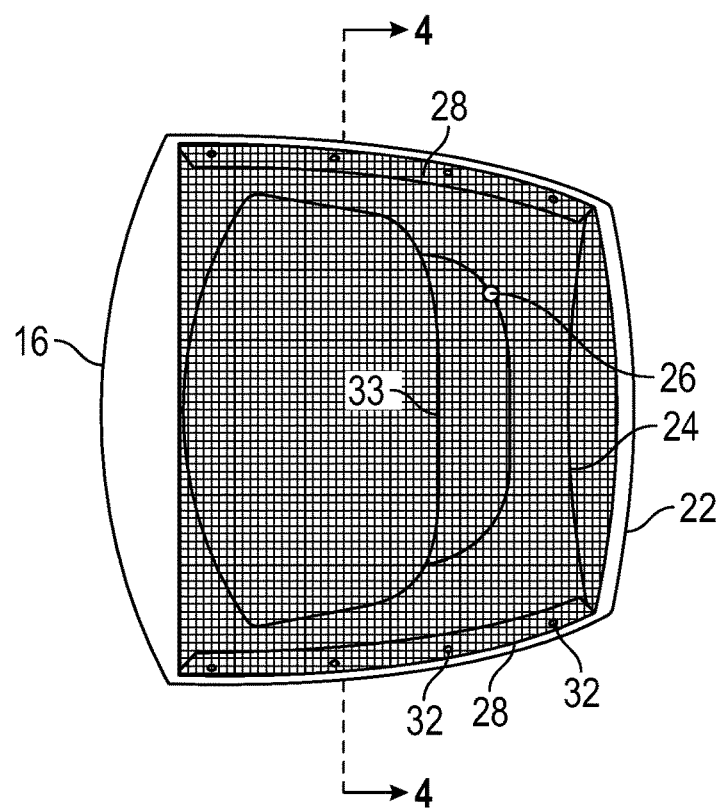
FIG. 3 shows in plan view the hybrid seat pan and diaphragm assembly of FIGS. 1 and 2.

Referring to FIGS. 2 and 3, the hybrid seat pan and diaphragm assembly 16 comprises a pan frame 22 that has a strong perimeter. The pan frame 22 is separate from the side members 12 of the seat chassis 10. Thus, the hybrid assembly 16 can be dropped into the seat chassis and can be movably supported in the seat chassis. For example, the hybrid assembly 16 can be slidably supported for fore-and-aft movement within the seat chassis 10.

The perimeter of the pan frame 22 supports a contoured pan-like member or pan portion 24, which is mounted to bridge across the pan frame 22. The pan portion 24 could be formed as part of the pan frame 22. Alternatively, the pan portion 24 can be formed as a molded part that is bonded or otherwise attached to the pan frame 22, including as a drop-in piece.

Figure 4:
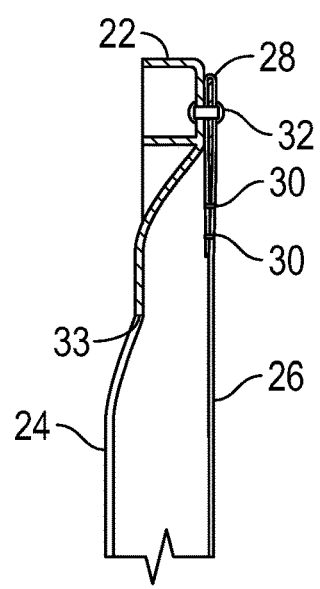
FIG. 4 shows in side sectional view hybrid seat pan and diaphragm assembly of FIGS. 1-3.

Above the pan portion 24, a flexible diaphragm 26 is tensioned across the pan frame 22. Referring to FIGS. 3 and 4, side edges of the diaphragm 26 are folded around stiffeners 28 and are secured to the stiffeners by stitches 30. The diaphragm 26 is stretched and then attached to the perimeter of the frame 22 by rivets 32 that pass through the stiffeners 28. The riveted attachments tightly tension the diaphragm 26 into a position approximately one to two inches offset from the pan portion 24. Even when deflected toward the pan portion 24 by an occupant's weight, the tensioned diaphragm 26 absorbs the weight in a low-pressure manner so as to render an occupant comfortable by comparison to sitting directly on a conventional pan-and-cushion seating arrangement. For additional comfort, the pan portion 24 may include a cut-out 33, which can accommodate large deflections of the diaphragm 26.

Alternatively, the diaphragm 26 may be attached to and tensioned across the side members 12 of the seat chassis 10. That is, the diaphragm 26 would not be attached directly to the pan frame 22. This arrangement would be used when the pan portion 24 is not required to move within the seat chassis 10.

In place of the riveted attachments, the diaphragm 26 equally could be attached to the pan frame 22 (or to the seat chassis side members 12) in a manner substantially as shown in FIGS. 4 and 5 of co-pending and commonly owned U.S. patent application Ser. No. 14/244,524, hereby incorporated by reference in its entirety. An ordinary skilled worker may contemplate other modes of attaching the diaphragm 26 to the pan frame 22.

Referring back to FIG. 1, the hybrid seat pan portion 24 and the diaphragm 26 are installed into the seat chassis 10 as the completed subassembly 16. The subassembly 16 then is fitted with the cushion 18. The mountings (not shown) of the subassembly 16 can be designed as needed to accommodate specific structural features of a particular seat. The pan portion 24 is located above the cross beams 14 of the seat chassis 10. The cut-out 33 is positioned away from the cross beams 14. Thus, even when the diaphragm 26 has been deflected by an occupant's weight, the pan portion 24 prevents the diaphragm contacting the cross beams 14, brackets, braces, or other components of the seat chassis 10. The cut-out 33 may be substantial in size. Indeed, the pan portion 24 may be only a contoured member that disperses contact of the diaphragm 26 against the cross beam 14.

In certain designs the pan portion 24 can rest in contact with the rearward beam 14, separated by a vibration absorbing pad 34. Such a pad is not needed in designs where the pan portion 24 remains above and apart from the beam 14.

The hybrid seat pan and diaphragm assembly 16 is described as a seat bottom structure. The principle of using a seat pan to control the displacement of a seat suspension diaphragm could also be applied to a seat back. While the comfort enhancing effects are more dramatic with seat bottoms, the hybrid seat pan and diaphragm can be useful on certain seat backs, particularly in applications such as lie flat seats or seats where the back has substantial recline. Accordingly, terms of direction such as "above" are used only for convenience of description and are not meant to limit the invention to any particular orientation or arrangement.

Concomitant to their comfort benefits, the hybrid seat pan and diaphragm also permit use of thinner cushions, thereby reducing the overall weight of a seat assembly.

The hybrid seat pan and diaphragm assembly 16 is described relating to aircraft seating. However, it is easily understood how the arrangement could be used with similar benefits for seating of all types.

Although exemplary embodiments of the invention have been described with reference to attached drawings, those skilled in the art nevertheless will apprehend variations in form or detail that are consistent with the scope of the invention as defined by the appended claims.

What is claimed is:

1. A hybrid seat pan and diaphragm apparatus comprising:
   a seat pan that has a concave portion; and
   a diaphragm positioned at an occupant-facing side of the seat pan and stretched across the seat pan at a first distance above the concave portion of the seat pan;
   wherein the seat pan restricts deflection of the diaphragm under an occupant's weight by the diaphragm coming to rest on the seat pan such that an effective weight applied to the seat pan, by contact of the occupant with the seat pan via the diaphragm, is less than the occupant's weight.

2. The apparatus of claim 1 wherein the seat pan comprises a cutout portion central to the concave portion, and an occupant's weight can deflect the diaphragm through the cutout portion.

3. The apparatus of claim 1 wherein the diaphragm is stretched across the seat pan between stiffeners that are fastened to the seat pan by rivets.

4. The apparatus of claim 3 wherein side edges of the diaphragm are wrapped around the stiffeners and stitched together to capture the stiffeners.

5. The apparatus of claim 1 wherein the seat pan is contoured to reduce contact pressure of an occupant's weight.

6. A seat apparatus comprising:
   a seat chassis that has side frames connected by a cross beam;
   a seat pan above the cross beam; and
   a tensioned diaphragm above the seat pan;
   wherein the seat pan is contoured to reduce contact pressure of an occupant's weight; and
   wherein the seat pan restricts deflection of the diaphragm under an occupant's weight by the diaphragm coming to rest on the seat pan such that an effective weight applied to the seat pan, by contact of the occupant with the seat pan via the diaphragm, is less than the occupant's weight.

7. The apparatus of claim 6 wherein the diaphragm is tensioned across the seat pan, with the seat pan and the diaphragm being removable from the seat apparatus as a subassembly.

8. The apparatus of claim 7 wherein the diaphragm is stretched across the seat pan between stiffeners that are fastened to the seat pan by rivets.

9. The apparatus of claim 8 wherein side edges of the diaphragm are wrapped around the stiffeners and stitched together to capture the stiffeners.

10. The apparatus of claim 6 wherein the diaphragm is tensioned across the side frames of the seat chassis.

11. The apparatus of claim 6 wherein the seat pan restricts the diaphragm from contacting the seat chassis.

12. The apparatus of claim 6 further comprising a vibration absorbing pad disposed between and in contact with the seat pan and the cross beam.

13. A method for making a hybrid seat pan and diaphragm apparatus, comprising:
   stretching a diaphragm; and
   attaching the stretched diaphragm at an occupant-facing side of a seat pan and at a first distance above a concave portion of the seat pan;
   wherein the seat pan restricts deflection of the diaphragm under an occupant's weight by the diaphragm coming to rest on the seat pan such that an effective weight applied to the seat pan by contact of the occupant with the seat pan, via the diaphragm, is less than the occupant's weight.

14. The method of claim 13 further comprising attaching the seat pan and diaphragm onto a seat chassis with the seat pan between the diaphragm and a cross beam of the seat chassis.

\* \* \* \* \*